United States Patent [19]
Clark

[11] 3,778,574
[45] Dec. 11, 1973

[54] GROUND-TEST SWITCH
[75] Inventor: Thomas F. Clark, Canton, Mass.
[73] Assignee: Allis-Chalmers Corporation, Milwaukee, Wis.
[22] Filed: June 26, 1972
[21] Appl. No.: 266,253

[52] U.S. Cl. .......................... 200/148 B, 200/148 R
[51] Int. Cl. ............................................ H01h 33/70
[58] Field of Search .................. 200/148 R, 148 B, 200/148 D

[56] References Cited
UNITED STATES PATENTS
3,348,001  10/1967  Upton, Jr. et al. ............... 200/148 R Primary Examiner—Robert S. Macon
Attorney—Robert C. Jones et al.

[57] ABSTRACT

A ground and test switch for metal enclosed gas insulated switchgear which allows testing of the internal conditions of the enclosed switchgear without draining the insulating gas therefrom. Operation of the circuit breaker contacts, contact resistance measurement, high voltage insulation testing, and other electrical and/or mechanical tests requiring connection to the high voltage conductor may be made.

14 Claims, 2 Drawing Figures

GROUND-TEST SWITCH

SUMMARY OF THE INVENTION

Present day electrical distribution practice evidences a strong trend to compact distribution substations which can be located in urban areas. This equipment of necessity must be compact for space saving construction. Such equipment typically utilizes a sulphur hexafluoride gas more commonly known or referred to as SF6 as an arc extinguishing medium. SF6 gas is expensive, consequently its use in switchgear equipment must be conserved. The substation switchgear equipment incorporates a grounding disconnect switch which is operative to ground a high voltage conductor disposed within the SF6 gas insulated switchgear equipment. Testing of the equipment has previously required that the SF6 gas be drained from the equipment which requires a lengthy handling procedure. Even with the most careful handling procedures the draining of the gas may result in at least some loss of gas.

It is the general object of the invention to provide a means for checking insulation and internal operation and conditions of gas insulated switchgear equipment.

Another object of the invention is to provide a means for determining the internal condition of gas insulated switchgear equipment that does not require draining of the gas from the equipment.

Still another object of the invention is to provide a test switch for gas insulated switchgear equipment which facilitates the determination of the internal condition of the equipment without requiring that the gas be drained from the equipment.

Still another object of the invention is to provide a multi-purpose switch which will serve as a ground-test switch for gas insulated switchgear equipment.

Another object of the invention is to provide an access means to high voltage conducting components of gas insulated equipment for test purposes without draining the gas therefrom.

Still another object of the invention is to provide a multi-purpose ground-test-disconnect switch for gas insulated switchgear equipment which is relatively inexpensive and which may be incorporated as a standard component of the equipment.

DESCRIPTION OF THE INVENTION

Figure 1:
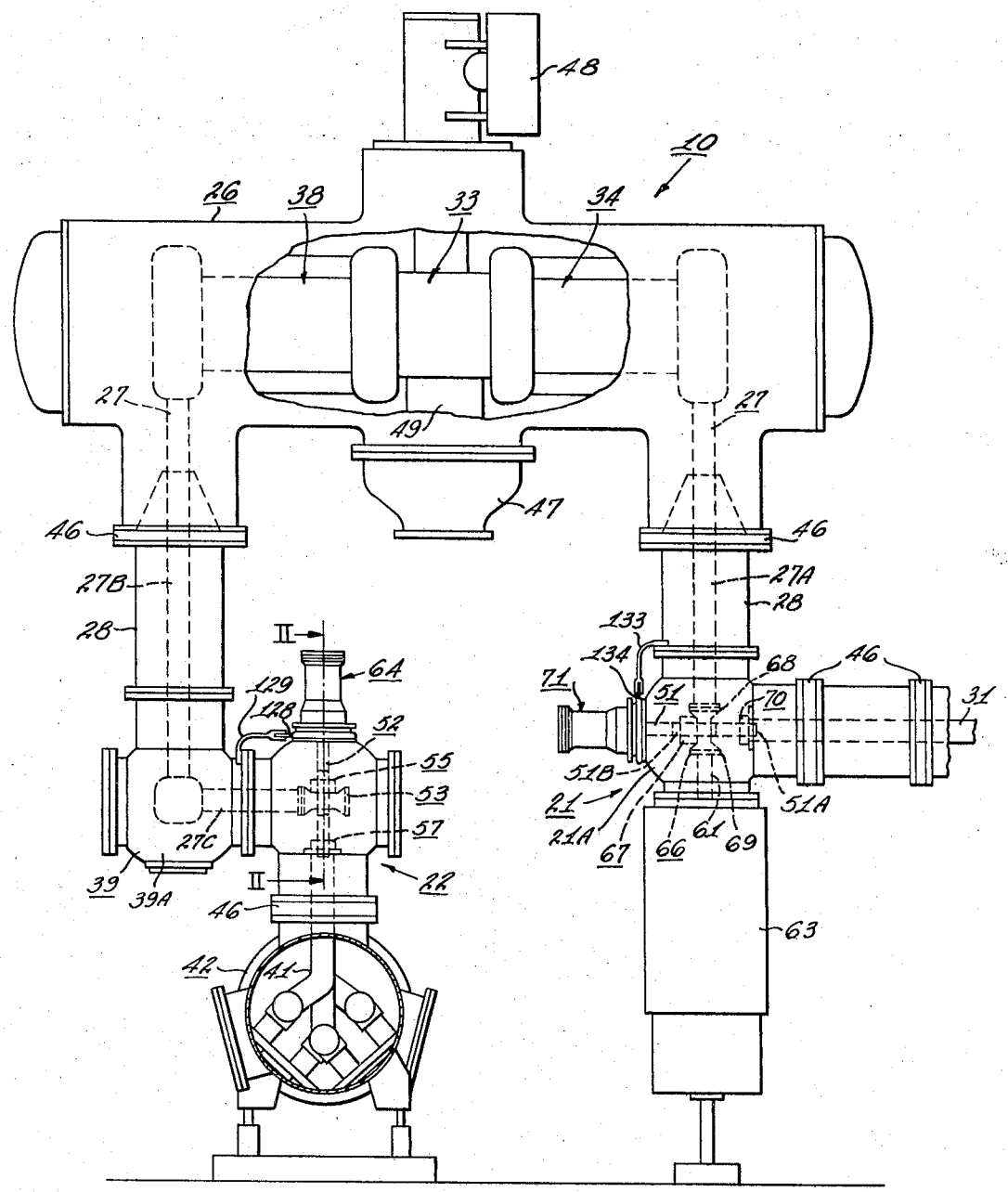
FIG. 1 is a plan view of a gas insulated substation distribution system in which the invention is incorporated to good advantage; and, FIG. 2 is an enlarged fragmentary view partially in vertical section and partially in elevation taken in a plane represented by the line II—II in FIG. 1.

In FIG. 1 there is shown a structure comprising one pole or phase of a high voltage substation 10. Additional phase units, similar to the one depicted, may be provided as required. Each phase unit comprises a number of interconnected components such as a pair of ground-test-disconnect switches 21 and 22, a circuit breaker 26 which is interconnected by generally cylindrical bus conductors 27 enclosed in housings 28 which are generally cylindrical in configuration. While a combination ground-test-disconnect switch is herein shown as an exemplifying arrangement in which the invention may be incorporated, it is to be understood that the invention will find full expressions when incorporated in a ground-test switch combination. An incoming high voltage line 31 is shown connected into the distribution substation 10 through the ground-test-disconnect switch 21. The high voltage line 31 is connected through the ground-test-disconnect switch 21, the separable contacts (not shown) of an interrupter 33, a junction box 39, the ground-test-disconnect switch 22 to a bus 41 of a multi-bus unit 42 to feed a transformer (not shown) or other equipment.

The external housings 28, the ground-test-disconnect switches 21 and 22, the junction box 39, the bus unit 42 as well as the circuit breaker 26 contain an insulating gas such as sulphur hexafluoride, more commonly referred to as SF6 gas, under pressure. To allow components of the substation system 10 to be taken out of service without affecting the remaining components of the system 10 each of the components is sectionalized. This is accomplished by providing insulators 46 between each component. These insulators 46 not only serve to sectionalize each component, but also serve to support the bus conductors 27 in spaced relationship within the cylindrical housings 28.

The circuit breaker 26 depicted is of the gas blast type which incorporates the interrupter 33 having series related separable contacts 34 and 38. Arc extinction is affected in a well known manner as by supplying a blast of compressed SF6 gas through an arc drawn between the pairs of separable contacts 34 and 38, as they are parted. For this purpose a supply of SF6 gas under relatively high pressure is stored in a tank 47 that is secured to the tank of the circuit breaker 26. Valve means (not shown) are operable when actuated by operating mechanism 48 to allow a blast of gas to emit from the storage tank 47. The blast of gas from the tank 47 is directed by means of a manifold 49 to the arc area between the separated contacts of each pair of contacts 34 and 38.

Figure 2:
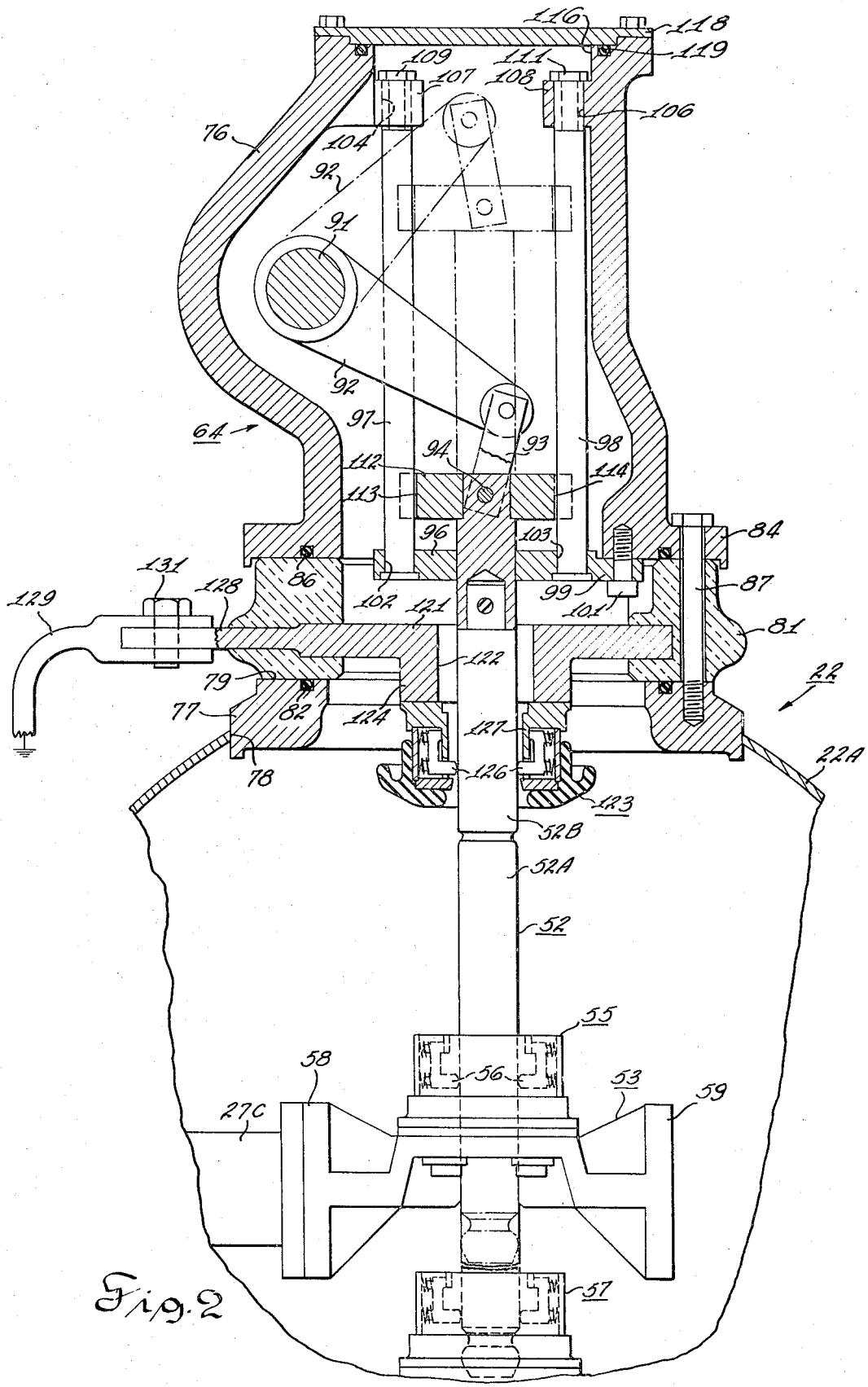

The ground-test-disconnect switches 21 and 22 are similar and each include a contact rod 51 and 52 respectively which when the switch is closed, as depicted in FIG. 1, provide for a continuity of the electrical circuit. Thus, the ground-test-disconnect switch 22, which exemplifies both switches includes the contact rod 52 comprising an outer or lower metallic conductor portion 52A and an inner or upper insulating portion 52B and the contact terminal bracket 53 which is supported within the switch housing 22A by an insulator (not shown). The terminal bracket 53 includes a contact 55 having a plurality of radially disposed inwardly biased contact fingers 56 as depicted in FIG. 2, the assembly which being hereinafter referred to as a contact cluster through which the contact rod 52 of a switch 22 extends when it is in fully closed position to establish electrical continuity between the bus conductor 27C and 41. The contact rod 52 passes through the bracket and engages in a contact cluster 57 similar to the cluster 55 which is supported within the switch housing 22A and to which the bus conductor 41 is connected. The bracket 53 is provided with a pair of diametrically opposed electrical interconnecting conductive pads 58 and 59 only one of which is utilized in the present illustrative embodiment. The end of the bus conductor 27C is secured in electrical conductive relationship to the pad 58. Full extension of the contact rod 52 into engagement with the contact cluster 57 or to a retracted position wherein it is engaged only in the contact cluster 55 associated with the bracket 53 is affected by means of an operating mechanism 64 attached to the external surface of the switch housing 22A. Thus, operation of the contact rod 52 to its fully extended position will establish electrical continuity between the bus conductors 27C and 41. However, if the contact rod 52 is actuated to its retracted position wherein it is engaged only in the contact cluster 55 of the bracket 53, then the ground and test connection is established to the high voltage conductor 27C.

The ground-test-disconnect switch 21 is similarly arranged having an axially movable contact rod 51 comprising a metallic conductor extending portion 51A and an inner insulated portion 51B. A conductng terminal bracket 66 is supported within the switch housing 21A and includes a contact cluster 67 and a pair of diametrically opposed electrical interconnected conductive pads 68 and 69. In this instance the bus conductor 27A has its one end connected to the pad 68 while the pad 69 has secured to it the end of a bus conductor 61 leading to a lightning arrester 63. A contact cluster 70 is supported in the switch housing 21A at the right side thereof and has connected to it the high voltage bus conductor 31. A contact operating mechanism 71 is mounted externally of the switch housing 21A and is operatively connected to affect the axial movement of the contact rod 51, in a manner similar to the contact rod 52 of the switch 22. Thus, with the contact rod 51 in its fully extended position as depicted, electrical continuity is completed between the high voltage bus conductor 31 and the bus conductor 27A and the conductor 61 associated with the lightning arrester 63. However, when the contact rod 51 is retracted wherein it is disengaged from the contact cluster 70 but is still engaged in the contact cluster 67 the high voltage bus conductor 31 is disconnected from the system and the incoming high voltage electrical continuity is interrupted and the internal right side of the system is grounded.

The ground-test-disconnect switches 21 and 22 may be used during maintenance or other outages when operating procedures call for grounding of the high voltage conductors within the gas insulated metal enclosed high voltage substation 10. When the substation 10 is tested at periodic intervals, it is desirable to determine the internal condition of equipment thereof without draining the relatively expensive SF6 insulating gas, which involves relatively lengthy handling procedures. For this purpose the ground-test-disconnect switches 21 and 22 are provided to simplify the testing of equipment, reduce the outage time interval and conserve the supply of insulating gas.

Since both of the ground and test switches 21 and 22 are identical, a description of the switch 22 will also apply to the switch 21. As shown in detail in FIG. 2, the ground-test-disconnect switch 22 includes a housing 22A in which the conductive bracket 53 is supported in insulated relationship to the housing by means of an internal insulator (not shown). The ends of the conductors 27C within the housing 22A is mechanically connected to the pad 58 of the conductive bracket 53. The bus conductor 41 extends into the housing 22A and is connected to the contact cluster 57 which is supported therein by an insulator (not shown) in axial alignment with the cluster 56 and the contact rod 52. As is well known and is usual in switches utilized in high voltage stations of this nature, a corona shield (not shown) surrounds the bracket 53 and is also supported by the insulator support (not shown). The bracket 53 is provided with a contact cluster 55 having a plurality of flexible radially conducting fingers 56 which are adapted to conductively engage the surface of the contact rod 52 associated with the switch 22.

As shown in FIG. 2 and as previously mentioned, the ground-test-disconnect switch contact rod 52 is a multi-sectional unit comprising a lower metallic portion 52A and an insulating portion 52B which electrically insulates the lower conductive portion 52A of the rod from the enclosure housing 22A. Axial movement of the rod 52 into and out of engagement with the contact cluster 57 is effected by means of the operating mechanism 64 comprising a sealed metallic enclosure casing 76 that is mounted in gas tight relationship on the housing 22A. For this purpose, the upper end of the housing 22A is provided with a mounting ring 77 which is welded in gas tight relationship in a circular opening 78 formed in the housing 22A.

The upper surface of the mounting ring 77 is provided with a flat circular mounting surface 79 which is adapted to receive an insulator collar 81. An O-ring 82 is provided to seal the joint surface between the upper surface of the mounting ring and the axial end face of the insulator collar 81.

A radially extending circular flange 84 is integrally formed on the lower end of the operator enclosure 76 and is adapted to seat on the upper axial end face of the insulator collar 81. A gas tight seal is effected between the joint surface of the flange 84 of the enclosure 76 and the upper end surface of the insulator collar 81 by an O-ring 86 that is disposed in an axial circular groove formed in the face of the flange 84. The enclosure 76 and the insulator collar 81 are maintained in operative relationship on the mounting ring 77 by means of a plurality of screws 87, one of which is shown, which extend through suitable openings provided in the flange 84 and the wall of insulator collar 81 into threaded engagement into the metallic mounting ring 77.

To effect axial movement of the contact rod 52 there is provided a crankshaft 91 which extends through the wall of the enclosure 76 being journaled therein in sealed relationship providing a gas-tight rotatable joint. The end of the drive shaft 91 within the enclosure 76 receives a crank arm 92 which is secured on the shaft 91 for rotation with the shaft. The extending free end of the crank arm 92 is pivotally connected to a pivot link 93. The opposite end of the pivot link 93 is pivotally connected at 94 to the upper end of the contact rod 52.

Vertical guides are provided to maintain the contact rod 52 in vertical position as it is moved axially. To this end a guide bracket 96 is provided which supports a pair of spaced vertically extending guide rods 97 and 98. To secure the guide rod bracket 96 in position within the enclosure 76, the bracket is formed with a radially extending flange portion 99 through which a plurality of screws 101, one of which is shown, extend into threaded engagement with the axial end of the enclosure casing 76. As shown in FIG. 2, the guide rods 97 and 98 extend upwardly through openings 102 and 103 formed in the bracket 96 passing through axially aligned bores 104 and 106 formed in a pair of inwardly extending bosses 107 and 108 that are an integral portion of the enclosure casing 76. Threaded cap members 109 and 111 are threadably engaged on the upper end of the rods 97 and 98 to lock the rods in position. A guide block 112 is secured to the upper end of the contact rod 52 and is provided with a pair of diametrically disposed vertical guide slots 113 and 114. As shown in FIG. 2, the guide slots 113 and 114 cooperate with the rods 97 and 98, respectively, to maintain the contact rod 52 in guided vertical position as it is moved axially.

An access opening 116 formed in the top of the enclosure 76 is sealed in a gas-tight manner by a removable plate 118. An O-ring 119 serves to prevent gas leakage between the cover plate 118 and the casing 76.

The contact rod 52 at the lower end of the enclosure 76 passes through a grounding ring 121. To this end the grounding ring 121 is molded into the internal wall of the insulator 81. An axial bore 122 having a diameter greater than a diameter of the rod 52 is formed in the ring to allow the rod 52 to pass therethrough without contacting the walls thereof. Selective grounding contact between the contact rod 52 and the grounding ring 121 is established by means of a contact cluster 123 through which the rod 52 passes. To mount the contact cluster 123 in operative position, the grounding ring 121 is formed with an axially extending hub 124. As shown, the contact cluster 123 which exemplifies all of the clusters hereinbefore mentioned, includes a plurality of resiliently inwardly biased contact fingers 126. Fingers 126 extend through openings formed in a caged portion 127 of the cluster in a manner to make electrical contact with the periphery of the rod 52.

With the contact rod 52 in its lowermost position as depicted in FIG. 2, an electrical continuity connection is established between the bus conductor 27C and the contact cluster 57 to which the conductor 41 is secured via the bracket 53. In this position of the contact rod 52 the conductive portion 52A thereof extends below the contact cluster 123 so that the insulated portion 52B thereof is located within the cluster 123 and no electrical connection between the cluster 123 and the bracket 53 is established. To interrupt the electrical continuity or in other words to disconnect the high voltage conductor 27C from an electrical contact with the bus contact cluster 57, the contact rod 52 is moved axially upwardly by the operating mechanism 64. To this end the crankshaft 91 is caused to rotate in a counterclockwise direction automatically upon a signal from a source not shown to effect the pivotal movement of the arm 92 in a counterclockwise direction thereby fitting or moving the rod 52 upwardly. With the contact rod 52 in full retracted position, as depicted by the phantom lines in FIG. 2, the contact rod 52 will be moved upwardly a sufficient distance so that the conductive portion 52A of the rod 52 is moved within the cluster 123 wherein the fingers 126 thereof engage the peripheral surface of the conductive portion 52A. In this position of the contact rod 52, the lower end or tip of the rod has been disengaged from the contact cluster 57 but still remains within the contact cluster 55 of the bracket 53. Thus a grounding connection is established between the bracket 53 and the grounding ring 121 via the contact cluster 123. Thus the switch 22 has operated to disconnect the high voltage bus conductor 27C from the high voltage bus conductor 41; and has operated to establish a ground connection between the high voltage conductor 27C and the grounding ring 121.

As shown in FIG. 2, a removable grounding circuit is established between the ground ring 121 and ground, which in this particular case can be the external housings of the junction box 39 as depicted in FIG. 1 and schematically shown in FIG. 2. To this end, the ground ring 121 is provided with a terminal or lead 128 that is constructed and arranged to extend radially outwardly through the wall of the insulator collar 81. To provide a sealed relationship between the insulator collar 81 and the ground ring lead 128 the insulator collar 81 is molded around the ring and lead 128 to provide a gas-tight seal therewith.

A removable ground cable 129 is electrically secured as by means of a bolt 131 to the extending end of the lead 128. The opposite end of the cable 129 is secured in a similar manner to the flange of the housing 39A of the junction box 39 as depicted in FIG. 1. A similar arrangement is provided for the ground-test-disconnect switch 21 which is likewise provided with a grounding cable 133 that has one end secured to a ground ring lead 134 associated with a ground ring (not shown) similar to the ground ring 121. The opposite end of the cable 133 is securely grounded to the flange portion of the housing 28. Thus, with both disconnect switches 21 and 22 in full open position wherein the associated contact rods 51, 52, respectively, are in upper most position grounding the respective bus brackets 66 and 53 with their associated ground rings such as the ground ring 121 associated with the switch 22. The high voltage conductors 27C associated with the switch 22 and the high voltage conductor 27A associated with the switch 21 on each side of the breaker 26 are grounded. The incoming bus 31 and the bus 41 on the opposite sides of the disconnect switches 21 and 22, respectively, may remain at high potential since the open gap provides effective insulation.

When both disconnect switches 21 and 22 are opened and the associated breaker conductors 27A and 27C are connected to ground rings such as the ring 121 associated with the switch 22, it is possible to remove the external ground straps 129 and 133 from the extending leads 128 and 134, respectively, and leave the conductors at a potential other than ground. With the ground straps 129 and 133 removed from the leads 128 and 134 test equipment may be attached to these external connections so that measurements of insulators, capacitors, contact operation and so forth up to a test voltage of approximately 10kv may be made. With the disconnect switch 32 and 22 both in open position the contacts of the circuit interrupters 34, 38 of the breaker 26 can be opened and closed for test purposes. However, before the disconnect switches 21 and 22 may again be reclosed the circuit breaker 26 must be in open position.

Since the external ground connection 128 and 134 are outside of the housing, it is not necessary to remove the gas from any compartment for tests.

To place the substation system back in operation, the test equipment is disconnected from the terminals 128 and 134 and the grounding cables 129 and 133 connected to these leads. The interrupters 34 and 38 are operated to their open position and the disconnect switches 21 and 22 are operated so to move the respective contact rods 51 and 52 fully downwardly into engagement with the contact clusters 70 and 57, respectively, to again reestablish electrical continuity between the bus conductors 27A and 31 and 27C and 41.

In the preferred embodiment depicted herein two ground-test-disconnect switches 21 and 22 have been incorporated into the high voltage substation system disclosed. With this arrangement wherein a ground-test-disconnect switch is incorporated on each side of the circuit breaker 26 the full advantage of the maintenance and test procedures afforded by the invention may be realized. It will be appreciated that while the invention has been incorporated into a ground-test-disconnect switch, the invention as envisioned is fully as useful and full advantage attained therewith in a switch in which no disconnect function is required, such as a ground-test switch.

The embodiments of this invention in which an exclusive property or privilege is claimed are defined as follows:

1. A ground-test switch for high voltage equipment comprising;
   a metallic casing in which an insulating gas is confined;
   at least one high voltage conductor entering into said casing;
   an external ground connection entering into said casing;
   means operable to insulate said external ground connection relative to said casing; and,
   contact means supported within said casing for movement into and out of conductive engagement with said high voltage conductors within said casing and said external ground connection.

2. A ground-test switch according to claim 1 wherein there is provided a removable ground connection in series with said external ground connection, whereby the removable ground connection may be taken out of the circuit of said external ground connection and test equipment connected to said external ground connection for testing the internal characteristics of the high voltage equipment with which said ground-test switch is associated.

3. A ground-test switch according to claim 1 wherein there is provided actuating means operably connected within said switch to actuate said contact means into and out of engagement with said high voltage conductors and said external ground connection.

4. A ground-test switch according to claim 3 wherein said actuating means are constructed and arranged with means extending outwardly of said casing to afford operation of said actuating means externally of said casing.

5. A ground-test switch according to claim 4 wherein said contact means when moved out of engagement with said external ground connection maintains engagement with said high voltage conductors to establish electrical continuity between said conductors.

6. A ground-test switch according to claim 4 wherein said contact means is a contact rod constructed and arranged to be moved axially into and out of engagement with said high voltage conductors and said internal ground connection.

7. A ground-test switch according to claim 5 wherein said contact means include a metallic conductive portion and an insulator portion, and said actuating means is connected to the insulator portion thereof, and wherein said conductive portion of said contact means remains in engagement with said high voltage conductors with said insulator portions of said contact means being moved into engagement with said external ground connections.

8. A ground-test switch according to claim 4 wherein there is provided a conductive bracket supported within said casing in insulated relationship thereto, and said high voltage conductors are connected to said bracket, and said contact means is operable to engage with said bracket and said external ground connection.

9. A ground-test switch according to claim 4 wherein there is provided a contact actuator housing mounting on said switch casings;
   insulating means interposed between housing and said casing to electrically insulate one from the other in gas-tight relationship; and
   said external ground connection extends into said casing through said insulating means in gas-tight relationship.

10. A ground-test switch according to claim 9 wherein said external ground connection is provided with contact engaging means supported by said insulating means within said casing in position to be engaged by said movable contact means as said movable contact means engages the high voltage conductors.

11. A ground-test switch according to claim 10 wherein guide means are provided within said switch for maintaining said movable contact means in a guided path as it is moved to engage said high voltage conductors as for external ground connection.

12. A ground-test switch according to claim 11 wherein said movable contact means is supported for axial movement into operative engagement with said high voltage conductors and said contact engaging means associated with said external ground connection.

13. A ground-test switch according to claim 12 wherein said contact means of said external ground connection within said switch includes a ring member having an axial opening, said ring member being supported within said switch from said insulator portion to maintain electrical isolation from said switch; and said contact means of said external ground connection is carried by said ring member in co-axial relationship in position to be engaged by said contact means as it is moved into engagement with said high voltage conductors.

14. A ground-test switch according to claim 13 wherein the opening of said switch casing through which said high voltage conductors enter said switch are provided with insulators to support said high voltage conductors relative to said casing.

* * * * *